United States Patent Office 3,183,105
Patented May 11, 1965

3,183,105
CEMENT ADDITIVE COMPOSED OF A MIXTURE OF METHYL ACETATE AND METHYL ALCOHOL
Frank G. Serafin, Somerville, and Vance H. Dodson, Jr., Needham, Mass., assignors to W. R. Grace & Co., Cambridge, Mass., a corporation of Connecticut
No Drawing. Filed Oct. 18, 1963, Ser. No. 317,159
4 Claims. (Cl. 106—90)

This invention relates to hydraulic cements. In a particular aspect it relates to the use of an additive to improve the grinding and pack set characteristics of Portland cement.

Portland cement represents a class of hydraulic cements and is comprised essentially of two calcium silicates and a lesser amount of calcium aluminate and calcium aluminoferrite. These cements are produced by heating an intimate mixture of finely divided calcareous material (limestone) and argillaceous material (clay) to fusion to form a clinker. The clinker is ground with the addition of about five percent of gypsum, or some other form of calcium sulfate, to obtain desired setting qualities in the finished cement. Small amounts of other substances are sometimes added during grinding to impart special properties to the product.

During grinding of the clinker, cleavage of the particles exposes fresh or nascent surfaces. These surfaces have high energies which are probably due to the breaking of ionic bonds. The surface forces of the particles persist for some time after grinding and lead to pack set and/or poor cement fluidity if they are not reduced. Undue reduction or the complete absence of surface forces or attraction between the cement particles is undesirable because the cement becomes excessively fluid. On the other hand, if the surface forces are too great the cement tends to pack set and has a low bulk density because of the presence of high void volume agglomerates. Low bulk means that less cement by weight can be stored in a hopper or silo.

It has been known that certain polar molecules when added to the cement either during or after grinding will attach to the particles and reduce their surface forces. If the amount of additive used and/or if the time of addition are not correct, optimum dry dispersion is not obtained. For example, if an unusually active additive is present during grinding, it will produce a cement having extreme fluidity while in the mill. This causes the cement to pass rapidly through the mill before it is reduced to the desired size and, consequently, the number of recycle steps of oversized material is increased. The same additive, however, may give acceptable performance if mixed with the cement after grinding. Conversely, an additive which produces the desired degree of dry dispersion when ground with the clinker may not be realized if admixed after grinding.

It is, therefore, an object of this invention to provide an additive for Portland cement which functions as a grinding aid and pack set inhibitor. This objective is achieved by intergrinding with the cement an additive which is composed of a binary mixture of methyl acetate and methyl alcohol in the ratios of 78 to 82 percent of the former and 22 to 18 percent of the latter. Only a small amount of this additive need be used, such as 0.005 to 0.05 percent based on the weight of the cement. At addition rates below 0.005 percent, the grinding efficiency and the pack set inhibition property are not improved and at addition rates above 0.05 percent, the improvements are not significant. The preferred range is between about 0.02 to 0.035 percent. The additive reduces the surface forces of the cement to a desired state of dry dispersion that results in improved grinding and mill retention times as well as facilitating subsequent storage and transportation.

The term "grinding aid" describes an increase in production at constant product surface area and an increase in surface area at a constant production rate during the grinding of cement clinker and gypsum in the finish mill. "Pack set inhibition" refers to a reduction in the amount of energy necessary to initiate flow in cement. Most cements when compacted by vibration become semi-rigid and will not flow until considerable mechanical effort has been applied to disintegrate the semi-rigid mass. The pack set inhibition property is particularly important in unloading the dry cement powder from storage silos after transportation of the cement in trucks, barges, and railroad hopper cars.

Commercial grinding mills operate at approximately 240° F. to 280° F. and are swept with air at a high velocity. Methyl acetate boils at 130° F. and methanol boils at 140° F. In view of the low boiling points of the components of the additive as compared to the high temperature maintained in the mill, the additive must be modified in order to avoid vaporization at the grinding temperature. This is effected by diluting the additive with water to a concentration ranging between about 25% and 75% and adding the aqueous solution to the mill. It is added at a rate of 0.005% to 0.05% by weight of the cement solids.

The invention is further illustrated by the data which appear in the following Tables I to VI. In all tables, the additive of this invention which was used was composed of a mixture ranging from 78% to 82% of methyl acetate and 22% to 18% of methyl alcohol. The expression "percent by weight solids additive" means the active ingredients composed of the total amount of methyl acetate and methyl alcohol irrespective of whether the additive is in aqueous solution or not. A barrel of cement as referred to in the tables is equal to 376 pounds.

The information in Tables I to II was obtained by testing individual batches of the same type I Portland cement, each of which was prepared in the following manner:

The clinker was charged to a laboratory steel ball grinding mill and the mill was closed and heated to a temperature between 210° F. and 230° F. prior to rotation. The additive was then passed to the mill by means of a syringe and after a fixed number of revolutions, taking about 70 minutes, the mill was stopped and the pack set index and other properties of the ground cement were determined.

Pack set index is a relative term which numerically indicates the proclivity of a particular cement to pack set when it is stored or transported in bulk. The index is obtained in the following manner:

One hundred grams of cement are placed in a 250 milliliter Erlenmeyer flask set on top of a variable vibrator. The flask containing the cement is vibrated for 15 seconds, after which time it is removed from the vibrator and carefully placed in a jig with the axis of the flask lying horizontally. The flask is then rotated around its axis until the cement, which is compacted on the bottom of the flask, collapses. The flask is twisted by turning at 180° angles at approximately 100 twists per minute. The number of 180° twists required for the cement sample to collapse establishes the pack set index. Thus, the greater the energy requirement to break up the bed, the higher will be the pack set index.

Table I

| | Blaine surface area (cm.²/g.) | Pack set index |
|---|---|---|
| Cement without additive | 3,035 | 20.6 |
| Cement with additive (rate of addition, percent by weight solids additive/solids cement): | | |
| 0.005 | 3,120 | 15.1 |
| 0.010 | 3,150 | 9.7 |
| 0.015 | 3,220 | 9.1 |
| 0.020 | 3,250 | 8.0 |
| 0.025 | 3,320 | 7.2 |
| 0.033 | 3,390 | 6.7 |

The increase in surface area of the cement signifies that improved grinding efficiency is obtained with the use of the additive of this invention. The pack set index shows that the additive mitigates the tendency of the cement to compact.

Table II presents the effect of including the additive of this invention on compressive strengths of mortars compared to untreated cement mortars with equivalent cement surface areas.

Table II

| Blaine surface area (cm.²/g.) | | Percent by weight solids additive/ solids cement | Compressive strength of cement with additive (ASTM C-109 test), p.s.i.[1] | | |
|---|---|---|---|---|---|
| Cement without additive | Cement with additive | | 1 day | 7 day | 28 day |
| 3,130 | 3,120 | 0.005 | 99.2 | 99.4 | 91.4 |
| 3,160 | 3,150 | 0.010 | 105.4 | 112.0 | 109.1 |
| 3,205 | 3,220 | 0.015 | 94.4 | 96.3 | 99.5 |
| 3,290 | 3,250 | 0.020 | 90.0 | 106.9 | 100.8 |
| 3,340 | 3,320 | 0.025 | 109.1 | 101.0 | 104.0 |
| 3,420 | 3,390 | 0.033 | 107.0 | 101.5 | 105.1 |
| | | | [2] 100.8 | [2] 102.8 | [2] 101.6 |

[1] Based on cement without additive taken as 100.
[2] Average.

From this table, it is evident that in most instances there is an improvement in compressive strengths of the cement mortars containing the additive.

In addition to improving the grinding efficiency and pack set inhibition of cement as well as improving the compressive strength of cement mortars, the additive of this invention tends to detrain air. This is a desirable quality as it is known that concrete structures are weakened if air is entrained in the cement. Table III preesnts the effect of incorporating the additive in cement against untreated cement on the air content of mortars made from cements having equivalent surface areas.

Table III

| Blaine surface area cm.²/g. | | Percent by weight solids additive/ solids cement | Amount of air in cement treated with additive [1] |
|---|---|---|---|
| Cement without additive | Cement with additive | | |
| 3,130 | 3,120 | 0.005 | 103.7 |
| 3,160 | 3,150 | 0.010 | 92.7 |
| 3,205 | 3,220 | 0.015 | 93.9 |
| 3,290 | 3,250 | 0.020 | 101.2 |
| 3,340 | 3,320 | 0.025 | 91.5 |
| 3,420 | 3,390 | 0.033 | 92.9 |
| | | | [2] 96.0 |

[1] Based on cement without additive taken as 100.
[2] Average.

Table IV reflects the addition of a 50% aqueous solution of the additive of this invention (added at a rate of 0.025% by weight solids additive to cement solids) as compared to a cement without any additive in determining the respective compressive strengths on ASTM C-109 motar. Both cements were processed in a commercial grinding mill operating at a temperature of 245° F. The Blaine surface area of the untreated cement used to make the C-109 2-inch cubes was 3,140 cm.²/g. while the treated cement had a surface area of 3,255 cm.²/g. Six cubes (for each of the 1, 7 and 28-day tests) were made for each of two days from both treated and untreated cements, giving a total of 36 cubes. The average results of this test are as follows:

Table IV

| Cement | Compressive strength, p.s.i.[1] | | |
|---|---|---|---|
| | 1 day | 7 day | 28 day |
| Without additive | 100 | 100 | 100 |
| With additive | 97.4 | 104.9 | 104.1 |

[1] Based on the cement without the additive taken as 100.

It is noted that the treated cement gave higher 7 and 28-day strengths than the untreated cement. These strengths, particularly the 28-day strength, are significant because they serve to indicate the ultimate structural strength. The lower 1-day strengths are not sufficiently low to be of concern.

Table V illustrates certain beneficial effects which were derived from the use of a 33% aqueous solution of the additive of this invention in grinding cement as compared to the use of two commercial additives.

Table V

| Additive | Rate of addition, oz./bbl. cement | Air content, percent | Bbls. milled per hour | Pack set index |
|---|---|---|---|---|
| Commercial No. 1 | 1.5 | 7.1 | 104 | 19 |
| Commercial No. 2 | 2.5 | 8.9 | 90.5 | 40 |
| This invention | 1.4 | 6.0 | 120 | 9 |

It is noted that the additive of this invention reduced the pack set index ranging from 110% to 345%, increased the milling rate ranging from 13% to 25%, and reduced the air content of the cement ranging from 18% to 38% as compared to the two commercial additives.

Table VI shows that increased production is realized with the use of the additive of this invention, applied as a 25% aqueous solution, over a commercial additive. The test was carried out in grinding block type cement (high surface) in a commercial mill operating at a temperature of 245° F.

Table VI

| Additive | Addition rate (oz. per bbl. cement) | Production rate (bbls. per hour) | Blaine surface area (cm.²/g.) |
|---|---|---|---|
| Commercial No. 1 | 1.6 | 110 | 4,710 |
| This invention | 1.6 | 130 | 4,796 |
| Commercial No. 2 | 2.5 | 132 | 4,550 |
| This invention | 2.0 | 139 | 4,552 |

It is noted that at equal rates of addition the additive of this invention was influential in increasing the grinding rate by 15% over the commercial additive and at an addition rate of less than 25% over the commercial additive the grinding rate was still increased by 5%.

The present invention provides an additive for Portland cement which improves the grinding efficiency with a consequent increase in production rates. In addition, it decreases the tendency of the cement to pack set. Additional advantages are realized in increased compressive strengths of mortars and concretes prepared from cements containing the additive as well as a decrease in air entrainment. An economic advantage is gained in that the additive is derived as a by-product in the hydrolysis of polyvinyl acetate to polyvinyl alcohol.

We claim:
1. A dry Portland cement containing about 0.005% to 0.05% by weight of an additive consisting of a mixture of

78% to 82% by weight of methyl acetate and 22% to 18% by weight of methyl alcohol.

2. A dry Portland cement containing about 0.02% to 0.035% by weight of an additive consisting of a mixture of 78% to 82% by weight of methyl acetate and 22% to 18% by weight of methyl alcohol.

3. A process for reducing the tendency of Portland cement to pack set and to improve the grinding efficiency thereof which comprises admixing with said cement during the grinding thereof a 25% to 75% aqueous solution of an additive consisting of a mixture of 78% to 82% by weight of methyl acetate and 22% to 18% by weight of methyl alcohol at a rate of 0.005% to 0.05% based on the weight of the cement.

4. A process for reducing the tendency of Portland cement to pack set and to improve the grinding efficiency thereof which comprises admixing with said cement during the grinding thereof a 25% to 75% aqueous solution of an additive consisting of a mixture of 78% to 82% by weight of methyl acetate and 22% to 18% by weight of methyl alcohol at a rate of 0.02% to 0.035% based on the weight of the cement.

References Cited by the Examiner
UNITED STATES PATENTS

| | | | |
|---|---|---|---|
| 2,671,030 | 3/54 | Gobel | 106—102 |
| 2,857,286 | 10/58 | Striker | 106—102 |
| 3,093,499 | 6/63 | Blackwood et al. | 106—315 |
| 3,094,425 | 6/63 | Adams et al. | 106—315 |

TOBIAS E. LEVOW, *Primary Examiner.*